United States Patent Office 3,657,238
Patented Apr. 18, 1972

3,657,238
3-MORPHOLINOALKYL-2,1-BENZOISO-
THIAZOLINES
Joseph A. Skorcz, Milwaukee, and John T. Suh and Claude
I. Judd, Mequon, Wis., assignors to Colgate-Palmolive
Company, New York, N.Y.
No Drawing. Continuation-in-part of applications Ser. No.
571,967, Aug. 12, 1966, and Ser. No. 682,974, Nov. 14,
1967, now Patent No. 3,528,989. This application Apr.
27, 1970, Ser. No. 32,461
Int. Cl. C07d 87/46
U.S. Cl. 260—247.1        2 Claims

ABSTRACT OF THE DISCLOSURE

The compounds are 2,1-benzisothiazolines substituted in the 3-position which are useful pharmaceutical agents, especially central nervous system stimulants and antihypertensive agents. Compounds disclosed include 1,3-dimethyl-3-(3'-morpholinopropyl) - 2,1 - benzisothiazoline-2,2-dioxide and 1-3-dimethyl-3-(3'-N-methylpiperazinopropyl)-2,1-benzisothiazoline-2,2-dioxide.

RELATED CASES

The present application is a continuation-in-part of our earlier application Ser. No. 682,974 filed Nov. 14, 1967, now U.S. Pat. No. 3,528,989 and our earlier application Ser. No. 571,967 filed Aug. 12, 1966, now abandoned.

DETAILED DESCRIPTION

The novel compounds of the present invention may be represented by the following formula

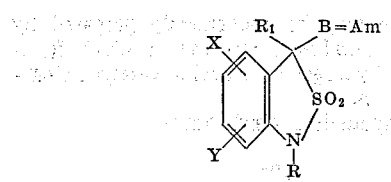

in which X and Y are selected from hydrogen, lower alkyl of 1 to 4 carbon atoms such as methyl, ethyl or propyl, lower alkoxy such as methoxy, ethoxy and propoxy, aralkoxy such as benzyloxy, nitro, halogen such as bromo or chloro and trifluoromethyl; R is selected from a lower alkyl of 1 to 4 carbon atoms, a cycloalkyl of 3 to 7 carbon atoms such as cyclopropyl, cyclohexyl or cyclopentyl, a cycloalkyl-lower alkyl in which the cycloalkyl contains 3 to 7 carbon atoms such as cyclopropylmethyl, cyclopentylmethyl and cyclohexylethyl, phenyl, a nuclear substituted phenyl, particularly a lower alkoxy-substituted phenyl such as p-methoxyphenyl, or an aralkyl of 7 to 11 carbon atoms, particularly a phenyl-lower alkyl such as benzyl, phenylisopropyl, $R_1$ is R, hydrogen or benzyl; B is a single chemical bond or a straight or branched chain alkylene of 2 to carbon atoms, and Am is hydroxy,

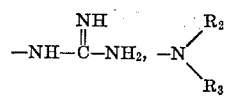

in which $R_2$ is selected from a lower acyl of 1 to 4 carbon atoms such as acetyl or propionyl or a lower carboalkoxy such as carbomethoxy or carbethoxy $R_3$ is hydrogen or $R_2$, and

in which $R_2$ and $R_3$ are joined together to form amino groups in which the nitrogen is part of the cyclic group such as a morpholino, pyrrolidino, piperidino, 1,2,3,4-tetrahydroisoquinolino, 1,2,3,4 - tetrahydroquinolino, a 4-lower alkyl-1-piperazino such as 4-methyl-1-piperazino, 3-hydroxypiperidino, and 4-hydroxypiperidino or Am is a cyclic amine group bonded through a nuclear carbon to B, including such groups as N-lower alkyl-2,3 or 4-piperidyls such as N-methyl-3-piperidyl, N-ethyl-4-piperidyl, N-ethyl-2-piperidyl and N-isopropyl-3-piperidyl, N-(dilower alkyl amino-lower alkyl)-2,3 or 4-piperidyls such as N-(beta-dimethylaminopropyl) - 4 - piperidyl, N-(beta-diethylaminoethyl)-3-piperidyl and N - (dimethylaminopropyl)-2-piperidyl, N-phenyl-lower alkyl-3 or 4-piperidyls such as N-benzyl-3-piperidyl, N-phenylethyl-4-piperidyl and N-phenylpropyl-3-piperidyl, 2-piperidyl, 3-piperidyl and 4-piperidyl, 2-pyrrolidyl, 3-pyrrolidyl, N-lower alkyl-2 or 3-pyrrolidyls such as N-methyl-2-pyrrolidyl, N-ethyl-3-pyrrolidyl, N-propyl - 4 - pyrrolidyl, N-phenyl-lower alkyl-2 or 3-pyrrolidyls such as N-benzyl-2-pyrrolidyl and N-phenylethyl-3-pyrrolidyl and 3-quinuclidyl; provided, however, that B can be a single chemical bond when Am is a cyclic amine group.

The compounds of the invention in which Am is

and $R_2$ and $R_3$ are not hydrogen, may be conveniently prepared by employing a halonaniline such as o-chloroaniline or m-bromoaniline, or an N-substituted haloaniline such as N-phenyl-o-chloroaniline, or N-p-methoxyphenyl-o-bromoaniline as the basic starting material.

If an unsubstituted haloaniline is employed, it is first treated with methanesulfonyl chloride to form a halo-methanesulfonanilide; the sulfonanilide is then treated with an alkyl ester such as dimethylsulfate, and a base such as potassium hydroxide, to form an N-substituted-halomethanesulfonanilide. The thus obtained sulfonanilide is then treated with a non-participating strong base, for example, an alkali amide such as sodium amide in an inert reaction medium such as liquid ammonia, anhydrous ether, benzene or the like, to effect ring closure. The 1- substituted - 2,1 - benzisothiazoline - 2,2-dioxide thus obtained can then be treated with an appropriate ester in the presence of a base to form the desired amine.

The described process may be diagrammed as follows:

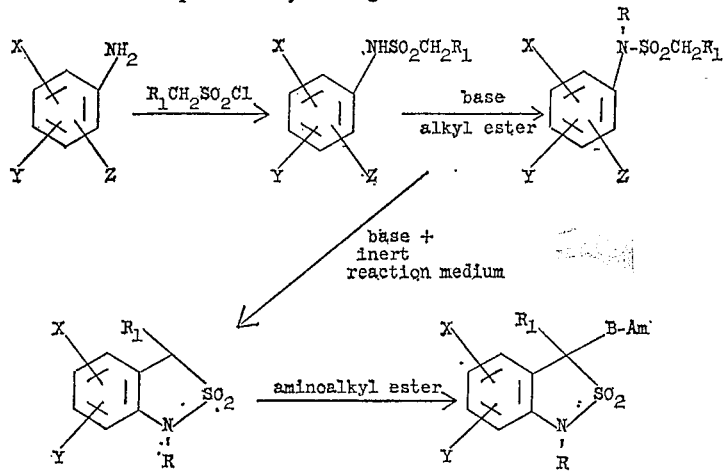

wherein R, R₁, X and Y are groups which do not interfere with or partake in the reaction.

If an N-substituted haloaniline is employed as the starting material, it is first treated with methanesulfonyl chloride to form the methanesulfonanilide derivative which may be treated directly with a suitable base in an inert reaction medium to effect ring closure. The 1,3-disubstituted - 2,1 - benzisothiazoline - 2,2-dioxide thus obtained is then treated with an appropriate ester in the presence of base to form the desired compound.

This process may be diagrammed as follows:

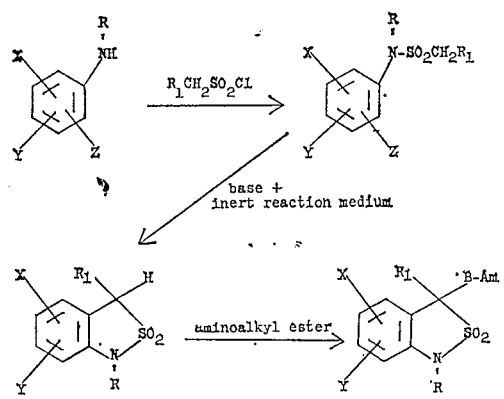

wherein R, R₁, X and Y are groups which do not interfere with or partake in the reaction.

Among the aminoalkyl esters which can be employed in the above processes are the following:

3-dimethylaminopropyl chloride,
3-diphenylaminopropyl chloride,
2-dibenzylaminoethyl chloride,
2-dicyclohexylaminoethyl bromide,
3-piperidinopropyl chloride,
morpholinoethyl chloride,
pyrrolidinoethyl chloride,
4-methylpiperazinoethyl chloride,
3-(N-methyl-N-benzylamino)propyl chloride,
2-dimethylaminoethyl tosylate,
2-(N-methyl-N-benzylamino)ethyl chloride, and
2-diethylaminoethyl bromide.

Representative of the novel compounds which can be prepared by employing the aminoalkyl esters in the described process are the following:

1-methyl-3-dimethylaminoethyl-2,1-benzisothiazoline-2,2-dioxide,
1-phenethyl-3-dimethylaminoethyl-2,1-benzisothiazoline-2,2-dioxide,
1-methyl-3-benzylmethylaminoethyl-2,1-benzisothiazoline-2,2-dioxide,
1-methyl-3-phenyl-3-(2'-benzylmethylaminoethyl)-2,1-benzisothiazoline-2,2-dioxide,
1-phenethyl-3-(2'-benzylmethylaminoethyl)-2,1-benzisothiazoline-2,2-dioxide,
1-phenyl-3-(2'-benzylmethylaminoethyl)-2,1-benzisothiazoline-2,2-dioxide,
1,3 - dimethyl-3-(2'-benzylmethylamioethyl)-2,1-benzisothiazoline-2,2-dioxide,
1-methyl-3-(2'-piperidinoethyl)-2,1-benzisothiazoline-2,2-dioxide,
1-ethyl-3-(3'-N-methylpiperazinopropyl)-2,1-benzisothiazoline-2,2-dioxide,
1-propyl-3-(2'-morpholinoethyl)-2,1-benzisothiazoline-2,2-dioxide,
1-ethyl-3-methyl-4-(3'-dimethylaminopropyl)-2,1-benzisothiazoline-2,2-dioxide,
1-phenylethyl-3-(2'-N-methylpiperazinoethyl)-2,1-benzisothiazoline-2,2-dioxide,
1-cyclopentylmethyl-3-(3'-morpholinopropyl)-2,1-benzisothiazoline-2,2-dioxide,
1-ethyl-3-phenyl-3-(4'-N-methylpiperazinopropyl)-2,1-benzisothiazoline-2,2-dioxide,
1-ethyl-3-phenyl-3-(2'-piperidinoethyl)-2,1-benzisothiazoline-2,2-dioxide, The compounds in which Am is

and R₂ is hydrogen may be conveniently prepared by subjecting the corresponding compound in which R₂ is benzyl and R₃ is not hydrogen or benzyl to catalytic cleavage of the benzyl group.

Similarly, the compounds in which Am is

and both R₂ and R₃ are hydrogen may be prepared by subjecting the corresponding compound in which R₂ and R₃ are benzyl to catalytic cleavage of the benzyl groups.

The catalytic cleavage of the benzyl group may be readily effected by dissolving the N-mono or dibenzyl derivative in a suitable medium and adding a catalyst, such as palladium on carbon, and hydrogen under pressure, as up to about 100 p.s.i. The cleavage may also be effected by reacting the appropriate benzyl derivative with a chloroformate such as methyl chloroformate, ethyl chloroformate or the like, to form the corresponding N-carboalkoxy derivative, and subjecting that compound to hydrolysis conditions.

Representative of the compounds which may be prepared in the described manner are the following:

1-methyl-3-(3'-methylaminopropyl)-2,1-benzisothiazoline-2,2-dioxide,
1-phenyl-3-(2'-methylaminoethyl)-2,1-benzisothiazoline-2,2-dioxide,
1-ethyl-3-(3'-methylaminopropyl)-2,1-benzisothiazoline-2,2-dioxide,
1,3-dimethyl-3-(3'-methylaminopropyl)-2,1-benzisothiazoline-2,2-dioxide,
1-methyl-3-phenyl-3-(2'-ethylaminoethyl)-2,1-benzisothiazoline-2,2-dioxide,
1-ethyl-3-methyl-3-(3'-methylaminopropyl)-2,1-benzisothiazoline-2,2-dioxide
1-methyl-3-(3'-aminopropyl)-2,1-benzisothiazoline-2,2-dioxide,
1,3-dimethyl-3-(3'-aminopropyl)-2,1-benzisothiazoline-2,2-dioxide,
1-ethyl-3-phenyl-3-(3'-aminopropyl)-2,1-benzisothiazoline-2,2-dioxide,
1-ethyl-3-methyl-3-(2'-aminoethyl)2,1-benzisothiazoline-2,2-dioxide.

The compounds in which Am is a cyclic amine group may be prepared by treating a 1-substituted or 1,3-disubstituted-2,1-benzisothiazoline-2,2-dioxide with a suitable aminoalkyl ester such as an N-substituted heterocyclic halide or an N-substituted heterocyclic alkyl halide in the presence of a suitable base such as an alkali metal amide, in an inert reaction medium to form the desired compound.

Representative of the esters which may be employed in the described manner are the following:

N-methyl-3-chloropiperidine,
N-ethyl-4-bromopiperidine,
N-benzyl-3-chloropiperidine,
N-benzyl-4-chloropiperidine,
N-phenylpropyl-3-bromopiperidine,
N-methyl-3-chloropyrrolidine,
N-benzyl-3-bromopyrrolidine,
N-isopropyl-4-bromopyrrolidine,
N-phenylisopropyl-3-pyrrolidine,
N-(beta-diethylaminoethyl)-3-chloropiperidine,
N-(dimethylaminoethyl)-4-bromopiperidine,
3-chloroquinuclidine,
N-methyl-2-(2-chloroethyl)piperidine,
N-ethyl-3-chloromethylpiperidine,
N-benzyl-4-(3-bromopropyl)piperidine,
N-ethyl-2-(2-chloroethyl)pyrrolidine, and
N-benzyl-3-chloromethylpyrrolidine.

Representative of the compounds which may be prepared in the described manner are the following:

1-methyl-3-(3'-N-methylpyrrolidyl)-2,1-benzisothiazoline-2,2-dioxide,
1-methyl-3-(N-methyl-4'-piperidyl)-2,1-benzisothiazoline-2,2-dioxide,
1,3-dimethyl-3-(N-methyl-4'-piperidyl)-2,1-benzisothiazoline-2,2-dioxide,
1-ethyl-3-phenyl-3-(N-methyl-4'-piperidyl)-1,2-benzisothiazoline-2,2-dioxide,
1-methyl-3-(N-benzyl-3'-piperidyl)-2,1-benzisothiazoline-2,2-dioxide,
1,3-dimethyl-3-(N-benzyl-3'-piperidyl)-2,1-benzisothiazoline-2,2-dioxide,
1-ethyl-3-(N-ethyl-3'-pyrrolidyl)-2,1-benzisothiazoline-2,2-dioxide,
1,3-dimethyl-3-(N-ethyl-3'-pyrrolidyl)-2,1-benzisothiazoline-2,2-dioxide,
1-methyl-3-(N-phenethyl-3'-pyrrolidyl)-2,1-benzisothiazoline-2,2-dioxide, and
1,3-diethyl-3-(N-phenethyl-3'-pyrrolidyl)-2,1-benzisothiazoline-2,2-dioxide.

The compounds in which Am is a heterocyclic group containing a secondary nitrogen in the ring can be produced by subjecting the corresponding compounds containing a benzyl group on the nitrogen of the heterocyclic group to catalytic reductive cleavage to remove the benzyl group.

The catalytic reductive cleavage of the benzyl group is readily effected by adding the appropriate N-benzyl piperidyl or pyrrolidyl derivative, advisably as an acid addition salt, to a solvent such as water or a lower alcohol, adding a catalyst such as palladium and hydrogen under pressure, as up to about 100 p.s.i. A small amount of glacial acetic acid is generally included to promote the reaction. The hydrogenation proceeds quickly and its progress can be measured by the hydrogen uptake. When the hydrogen uptake ceases the reaction can be considered completed. After filtering the reaction mixture it can be evaporated to dryness and the product triturated with a solvent such as ether and separated by filtration.

Representative of the compounds which may be formed in this manner are the following:

1-methyl-3-(4'-piperidyl)-2,1-benzisothiazoline-2,2-dioxide,
1,3-dimethyl-3-(4'-piperidyl)-2,1-benzisothiazoline-2,2-dioxide,
1-ethyl-3-methyl-3-(3'-pyrrolidyl)-2,1-benzisothiazoline-2,2-dioxide,
1-ethyl-3-phenyl-3-(3'-pyrrolidyl)-2,1-benzisothiazoline-2,2-dioxide,
1-methyl-3-[3'-(2''-pyrrolidyl)propyl]-2,1-benzisothiazoline-2,2-dioxide, and
1,3-dimethyl-3-[2'-(4''-piperidyl)ethyl]-2,1-benzisothiazoline-2,2-dioxide.

In addition to the previously described processes, the novel amines of the present invention may be prepared by other conventional techniques. For example, the primary amines may be prepared by the hydrogenation of the corresponding nitriles which can in turn be prepared by treating the appropriate 1-substituted or 1,3-disubstituted-2,1-benzisothiazoline-2,2-dioxides with an $\alpha,\beta$-unsaturated nitrile such as acrylonitrile in the presence of a suitable base such as potassium hydroxide. In addition to acrylonitrile, other $\alpha,\beta$-unsaturated nitriles such as $\beta$-methyl-acrylonitrile may be employed in the process.

The above process may be illustrated as follows:

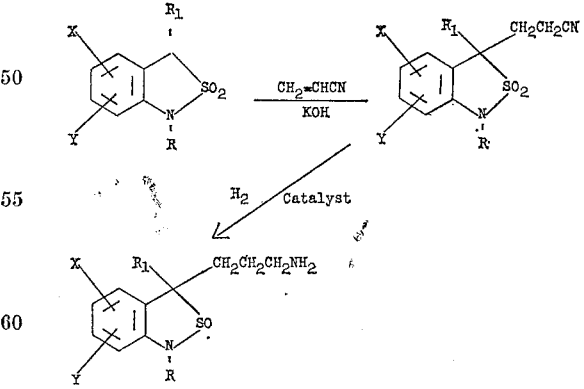

in which all symbols are as described and represent groups which do not interfere with or partake in the reaction.

The primary amines in which B is larger than propylene may be prepared from the nitriles obtained by treating the cyanoethyl derivative with a lower alkanol such as ethanol in the presence of a suitable catalyst such as hydrochloric acid to form the corresponding ethyl ester, treating that compound with lithium aluminum hydride to form the alcohol, then treating the alcohol with tosyl chloride in a suitable solvent such as pyridine to form the tosylate and finally treating the tosylate with sodium cyanide to form the nitrile and repeating the whole process, if desired, to add another methylene group.

This process may be illustrated as follows:

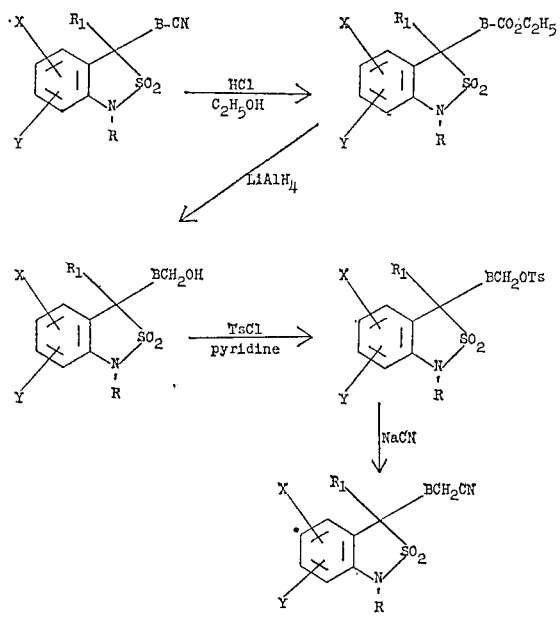

in which all symbols represent groups which do not partake in or interfere with the reaction.

The primary amines may be used to prepare a wide variety of secondary and tertiary amines and amine derivatives by use of conventional techniques. For example, the secondary and tertiary amines which are not cyclic can be formed by simply treating the primary amine with a suitable organic halide. The primary amine can also be converted to the corresponding dialkyl substituted derivative by treating with a suitable acid and aldehyde, e.g., formic acid and formaldehyde. The secondary amines can be prepared by first treating the primary amine with benzaldehyde and then treating the product with hydrogen in the presence of Raney nickel to form the corresponding benzylamino derivative.

The amines of the present invention may also be prepared by treating the corresponding tosylate, the preparation of which has been previously described, with an appropriate amine.

Among the derivatives of the amines which can be prepared are the diacyl derivatives and the guanidino derivative. The diacyl derivative may be formed by treating the primary amine with an acid anhydride such as acetic anhydride. The guanidino derivative may be prepared by treating the primary amine with methyl pseudothiourea in 70% aqueous ethanol under reflux conditions.

The described processes may be illustrated as follows:

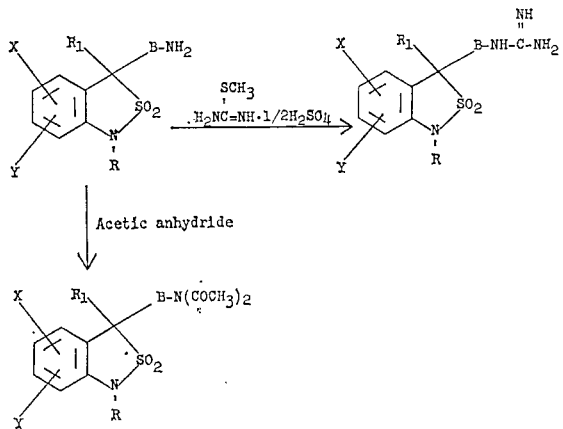

wherein all symbols are as described and do not partake in or interfere with the reaction.

The compounds in which X and Y are other than hydrogen are preferably prepared by using conventional nitration, chlorination and the like techniques to place the ring substituent into the 1-substituted-2,1-benzisothiazoline-,2,2-dioxide. For example, chlorine may be inserted into the 5-position by treating a 1-substituted-2,1-benzisothiazoline-2,2-dioxide with N-chlorosuccinimide in dimethylformamide.

Acid addition salts of the compounds of the present invention may be conveniently prepared by contacting the compounds with a suitable acid such as formic acid, citric acid, maleic acid, sulfuric acid, hydrochloric acid, succinic acid, tartaric acid, benzoic acid or fumaric acid.

Quaternary ammonium salts may be formed by contacting the compounds with a suitable alkylating agent such as dimethyl sulfate or an alkyl halide such as methyl chloride, methyl iodide or ethyl bromide.

The thiocyanic acid addition salts of the compounds when condensed with formaldehyde form resinous materials useful as pickling agents according to U.S. Pats. 2,425,320 and 2,606,155. The compounds also form fluosilicic acid addition salts which are useful as moth proofing agents according to U.S. Pats. 1,915,334 and 2,075,359.

The novel compounds of the invention are pharmacologically active. For example, the compounds 1-methyl-3-dimethylaminoethyl-2,1-benzisothiazoline-2,2-dioxide,
1-methyl-3-benzylmethylaminoethyl-2,1-benzisothiazoline-2,2-dioxide,
1-methyl-3-(3'-dimethylaminopropyl)-2,1-benzisothiazoline-2,2-dioxide,
1,3-dimethyl-3(3'-aminopropyl)-2,1-benzisothiazoline-2,2-dioxide,
1,3-dimethyl-3-(3'-hydroxypropyl)-2,1-benzisothiazoline-2,2-dioxide,
1,3-dimethyl-3-(3'-morpholinopropyl)-2,1-benzisothiazoline,2,2-dioxide,
1,3-dimethyl-3-(3'-aminopropyl)-5-chloro-2,1-benzisothiazoline,
1,3-dimethyl-3-(N-carbethoxy-2'-aminoethyl)-2,1-benzisothiazoline-2,2-dioxide and
1,3-dimethyl-3-(3'-guanidinopropyl)-2,1-benzisothiazoline-2,2-dioxide, when evaluated in mouse behavioral studies at intraperitoneal doses of 3 to 100 mg./kg. of body weight were all found to produce behavioral profiles resembling those of known antihypertensive agents. In addition, the forementioned compounds were also found in doses up to 100 mg./kg. to produce central nervous system stimulation as evidenced by an elevation of reactivity to stimuli, vocalization, pain response, pinnea hyperflexia and increased startle response. The mouse behavioral studies also indicated that the compounds were relatively safe and possessed $LD_{50}$ values in excess of 100 mg./kg. The behavioral studies were conducted essentially in accordance with the procedure outlined by S. Irwin in "Animal and Clinical Pharmacologic Techniques in Drug Evaluation," J. H. Nodine and P. E. Siegler, Ed. Year Book Medical Publishers, Inc., 1964. The forementioned compounds were also evaluated for hypertensive activity in the standard anesthetized, vagotomized dog preparation and found at intravenous doses of 10 mg./kg. to decrease the blood pressure in the animals 10% to 25% or more. When intended for pharmaceutical use, the compounds are preferably combined with one or more suitable pharmaceutical diluents and formed into unit dosage forms such as tablets, capsules or solutions. Such dosage forms provide suitable means for oral and parenteral administration.

The unit dosage forms may contain a concentration of 0.1% to 10% or more by weight of one or more of the novel compounds. Generally, such dosage forms will contain about 5 to 150 mg. of the active ingredients. One or more of such dosage forms may be administered daily.

The following examples are presented to illustrate this invention:

EXAMPLE 1

1-methyl-3-dimethylaminoethyl-2,1-benzisothiazoline-2,2-dioxide

To a solution of 0.033 mole of potassium amide in 250 ml. of liquid ammonia is added in one portion 5.5 g. (0.03 mole) of 1 - methyl - 2,1 - benzisothiazoline - 2,2-dioxide. The reaction mixture is stirred for 45 minutes and then treated dropwise with 5 equivalents of freshly distilled dimethylaminoethylchloride, liberated from its HCl salt with solid KOH in a distillation apparatus on a steam bath. After 4 hours, stirring is discontinued and the ammonia allowed to evaporate. Water (100 ml.) and ether (150 ml.) are added to the residue, and the separated aqueous layer extracted with two 100-ml. portions of ether. The ether solutions are combined and extracted with three 100-ml. portions of 10% HCl, which likewise are combined, made alkaline with solid NaOH, and washed three times with ether (100 ml.). The combined ether solution is dried ($Na_2SO_4$) and evaporated. Elution of the residual oil from 250 g. of alumina with benzene-ether (1:1) yields 1-methyl-3-dimethyl-aminoethyl-2,1-benzisothiazoline-2,2-dioxide in the form of a pale yellow oil.

Analysis.—Calcd. for $C_{12}H_{18}N_2O_2S$ (percent): C, 56.66; H, 7.13; S, 12.60. Found (percent): C, 56.22; H, 7.37; S, 12.76.

EXAMPLE 2

1-methyl-3-benzylmethylaminoethyl-2,1-benzisothiazoline-2,2-dioxide

The reaction of 11 g. (0.06 mole) of the compound of Example 1 with 0.066 mole of potassium amide in 500 ml. of liquid ammonia for 20 minutes, followed by the addition of 0.24 mole of N-benzyl-N-methylaminoethyl chloride in 100 ml. of dry benzene gives, after a 6-hour reaction time and the work-up procedure described in Example 1, 37 g. of an amber liquid. The excess aminoalkyl halide is distilled, and the residual oil put on a column of 250 g. of alumina. Elution with benzene-ether (4:1) provides 1-methyl-3-benzylmethylaminoethyl - 2,1 - benzisothiazoline-2,2-dioxide in the form of a yellow oil.

Analysis.—Calcd. for $C_{18}H_{22}N_2O_2S$ (percent): C, 65.41; H, 6.71; N, 8.48; S, 9.71. Found (percent): C, 65.59; H, 6.92; N, 8.76; S, 9.39.

A portion of the amine is converted to a maleate salt, which melts at 98–101° after recrystallization from 2-propanolether as a pale yellow powder.

Analysis.—Calcd. for $C_{22}H_{26}N_2O_6S$ (percent): C, 59.17; H, 5.87; N, 6.27. Found (percent): C, 59.27; H, 5.84; N, 6.16.

EXAMPLE 3

1-methyl-3-(3'-dimethylaminopropyl)-2,1-benzisothiazoline-2,2-dioxide

The compound of Example 1 (5.5 g., 0.03 mole) is allowed to react with 0.033 mole of potassium amide in 250 ml. of ammonia for 45 minutes and then with 15 g. (0.12 mole) of freshly distilled 3-dimethylaminopropyl chloride for 4 hours. The usual isolation procedure affords a crude product which is eluted from 350 g. of alumina with benzene-ether (1:1), as a nearly colorless oil.

Analysis.—Calcd. for $C_{13}H_{20}N_2O_2S$ (percent): C, 58.19; H, 7.51; S, 11.95. Found (percent): C, 57.36; H, 7.84; S, 11.48.

EXAMPLE 4

1,3-dimethyl-3-(3'-aminopropyl)-1,1-benzisothiazoline-2,2-dioxide hydrochloride

A solution of 22 g. (0.088 mole) of 1,3-dimethyl-3-(2' - cyanoethyl) - 2,1 - benzisothiazoline - 2,2-dioxide in 200 ml. of ethanol is treated at room temperature with hydrogen at 1000 p.s.i. in the presence of Raney nickel; the theoretical uptake is realized after 6 hours. The reaction mixture is then filtered, concentrated, and diluted with chloroform. This solution is extracted with three 100-ml. portions of hydrochloric acid, which are combined and made alkaline with solid sodium hydroxide. The separated oil is taken up in chloroform, which was dried ($Na_2SO_4$) and evaporated. The residual oil is eluted from 150 g. of silica gel with chloroform-methanol (1:3) to give the amine as a light amber gum. Conversion of a portion of this material to the hydrochloride salt, followed by recrystallization from ethanol-ether, affords 1,3-dimethyl - 3 - (3' - aminopropyl) - 2,1-benzisothiazoline-2,2-dioxide hydrochloride in the form of an off-white, nonhygroscopic powder, M.P. 173–175°.

Analysis.—Calcd. for $C_{12}H_{19}ClN_2O_2S$ (percent): C, 49.56; H, 6.58; Cl, 12.19; S, 11.03. Found (percent): C, 49.74; H, 6.41; Cl, 12.38; S, 11.20.

EXAMPLE 5

1,3-dimethyl-3-(3'-dimethylaminopropyl)-2,1-benzisothiazoline-2,2-dioxide hydrochloride A solution of 2.5 g. (0.01 mole) of the amine of Example 4, 4 g. of 90% formic acid, and 2 g. of 37% aqueous formaldehyde is heated on a steam bath for 18 hours, then treated with 0.9 ml. of concentrated hydrochloric acid, and concentrated under vacuum. The residue is diluted with water (40 ml.), extracted with ether, and made alkaline with solid sodium hydroxide. The separated oil is taken up in three 50-ml. portions of ether, which are combined, dried ($K_2CO_3$), and evaporated. Treatment of an ethereal solution of the residual oil with dry hydrogen chloride gives a gummy solid, which is recrystallized from ethanol-ether. The off-white granules of 1,3-dimethyl - 3 - (3' - dimethylaminopropyl)-2,1-benzisothiazoline-2,2-dioxide hydrochloride melt at 177–179°.

Analysis.—Calcd. for $C_{14}H_{23}ClN_2O_2S$ (percent): C, 52.73; H, 7.27; N, 8.78. Found (percent): C, 52.63; H, 7.46; N, 8.94.

EXAMPLE 6

1,3-dimethyl-3-(N,N-diacetyl-3'-aminopropyl)-2,1-benzisothiazoline-2,2-dioxide

A solution of the amine of Example 4 (2.5 g., 0.01 mole) and 10 ml. of acetic anhydride is heated on a steam bath for 5 hours, then poured into water and treated with solid sodium bicarbonate. The remaining oil is taken up in ether, which was washed with saturated $NaHCO_3$ solution, 7% HCl, and saturated brine. The dried ($Na_2SO_4$) solvent is evaporated to afford a semi-solid. Recrystallization from chloroform-petroleum ether gives a solid, M.P. 116–130°. This material is eluted from 40 g. of silica gel to give 1,3-dimethyl - 3 - (N,N-diacetyl-3'-aminopropyl) - 2,1 - benzisothiazoline-2,2-dioxide in the form of white granules, M.P. 133–135° after recrystallization from chloroform-petroleum ether.

Analysis.—Calcd. for $C_{16}H_{22}N_2O_4S$ (percent): C, 56.78; H, 6.55; N, 8.28. Found (percent): C, 56.66; H, 6.41; N, 8.11.

EXAMPLE 7

1,3-dimethyl-3-(3'-benzylaminopropyl)-2,1-benzisothiazoline-2,2-dioxide

A solution of the amine of Example 4 (4.4 g., 0.017 mole) and 1.8 g. (0.017 mole) of freshly distilled benzaldehyde in 75 ml. of dry benzene is refluxed in a water-separator apparatus for 15 hours. The benzene is dried and evaporated, and the residual oil in ethanol reduced with hydrogen at 50 p.s.i. in the presence of Raney nickel. The catalyst is filtered, the filtrate evaporated, and the remaining oil eluted from 200 g. of alumina with benzene-ether (2:1). The product is isolated as an oil which slowly solidified during refrigeration under petroleum ether, M.P. 89.5–91°.

Analysis.—Calcd. for $C_{19}H_{24}N_2O_2S$ (percent): C, 66.24; H, 7.02; N, 8.13. Found (percent): C, 66.05; H, 7.21; N, 7.90.

EXAMPLE 8

1,3-dimethyl-3-(3'-guanidinopropyl)-2,1-benzisothiazoline-2,2-dioxide sulfate A solution of the amine of Example 4 (2.54 g., 0.01 mole) and 1.4 g. (0.005 mole) of methyl pseudothiourea in 40 ml. of 70% aqueous ethanol is refluxed for 15 hours and then evaporated to dryness. The residual gum eventually solidifies after being forced out of methanol with 2-propanol, followed by refrigeration under dry ether. The 1,3-dimethyl - 3 - (3'-guanidinopropyl) - 2,1 - benzisothiazoline-2,2-dioxide sulfate in the form of a white powder melts at 120–135° as a foam.

*Analysis.*—Calcd. for $C_{26}H_{42}N_8O_8S_3$ (percent): C, 45.20; H, 6.13. Found (percent): C, 45.27; H, 6.50.

EXAMPLE 9

1,3-dimethyl-3-(3'-methylbenzylaminopropyl)-2,1-benzisothiazoline-2,2-dioxide hydrochloride A solution of the amine of Example 7 (2.6 g., 0.0075 mole), 4 g. of 90% formic acid and 2 g. of 37% formaldehyde is heated on a steam bath for 20 hours, cooled, treated with 0.8 ml. of concentrated HCl, and evaporated to dryness. Water is added, the insoluble material taken up in ether, and the aqueous phase made alkaline with solid NaOH. The liberated amine is taken up in ether, which is dried and evaporated. Elution of the residual oil from 75 g. of silica gel provides 1,3-dimethyl-3-(3'-methylbenzylaminopropyl) - 2,1 - benzisothiazoline - 2,2 - dioxide hydrochloride in the form of a colorless oil. The hydrochloride salt prepared from it melts at 202–203° after recrystallization from ethanol-ether.

*Analysis.*—Calcd. for $C_{20}H_{26}N_2O_2S \cdot HCl$ (percent): C, 60.81; H, 6.89; N, 7.09. Found (percent): C, 60.90; H, 6.93; N, 7.18.

EXAMPLE 10

1,3-dimethyl-3-(N-carbethoxy-2'-aminoethyl)-2,1-benzisothiazoline-2,2-dioxide To a solution of sodium (2.3 g., 0.10 g.-atom) in 150 ml. of ethanol under nitrogen is added 13.4 g. (0.05 mole) of the 1,3 - dimethyl - 3 - (2' - carbamylethyl)-2,1 - benzisothiazole - 2,2 - dioxide, and the resulting mixture is cooled and treated drop-wise with 8 g. (0.05 mole) of bromine in 50 ml. of ethanol. The milky solution is allowed to warm to room temperature, refluxed for 3 hours, acidified with acetic acid, and partially evaporated under vacuum. The remaining liquid is diluted with water (500 ml.) and extracted with two 100-ml. portions of ether, which are combined, extracted twice with saturated NaHCO₃ solution, washed with saturated brine, dried ($K_2CO_3Na_2SO_4$), and evaporated. Elution of this material from alumina with ether-chloroform (1:4) gives 1,3-dimethyl - 3 - (N-carbethoxy - 2' - aminoethyl) - 2,1 - benzisothiazoline - 2,2 - dioxide in the form of a pale yellow oil.

*Analysis.*—Calcd. for $C_{14}H_{20}N_2O_4S$ (percent): C, 53.85; H, 6.45; N; 8.97; S, 10.27. Found (percent): C, 53.77; H, 6.45; N, 9.01; S, 9.99.

EXAMPLE 11

1,3-dimethyl-3-(3'-hydroxypropyl)-2,1-benzisothiazoline-2,2-dioxide

To a cooled solotion of 1,3 - dimethyl - 3 - (2'-carbethoxyethyl) - 2,1 - benzisothiazoline - 2,2 - dioxide (17.4 g., 0.06 mole) in 150 ml. of dry ether is added under nitrogen a suspension of 1.4 g. (0.033 mole) of lithium aluminum hydride in 150 ml. of ether. The reaction mixture is stirred for 1 hour at room temperature and then treated with water. The ether layer is separated, dried ($Na_2SO_4$), and evaporated. Elution of the residual pale yellow oil from 240 g. of silica gel with ether-chloroform (4:1) affords 1,3 - dimethyl - 3 - (3' - hydroxypropyl) - 2,1 - benzisothiazoline - 2,2 - dioxide in the form of a colorless oil.

*Analysis.*—Calcd. for $C_{12}H_{17}NO_3S$ (percent): C, 56.44; H, 6.71; N, 5.48; S, 12.16. Found (percent): C, 55.92; H, 6.81; N, 5.16; S, 12.34.

EXAMPLE 12

1,3-dimethyl-3-(3'-hydroxypropyl)-2,1-benzisothiazoline-2,2-dioxide tosylate To a solution of the carbinol of Example 11 (10.7 g., 0.042 mole) in 60 ml. of dry benzene under nitrogen is added 2 g. (0.045 mole) of 53% sodium hydride dispersion. The mixture is stirred at 25° for 1 hour, refluxed for 1 hour, cooled, and treated with a solution of 8 g. (0.042 mole) of tosyl chloride in 50 ml. of benzene. The reaction mixture is refluxed for 8 hours, then stirred at room temperature for an additional 10 hours. Water is added, and the organic layer separated, dried ($Na_2SO_4$), and evaporated. The residual oil is eluted from 300 g. of silica gel. Benzene-ether (3:1) affords the tosylate as an oil. Refrigeration of the tosylate under petroleum ether yields 1,3 - dimethyl - 3 - (3' - hydroxypropyl)-2,1 - benzisothiazoline - 2,2 - dioxide tosylate in the form of a white, powdery solid, M.P. 88–90°.

*Analysis.*—Calcd. for $C_{18}H_{23}NO_5S$ (percent): C, 55.72; H, 5.66; N, 3.42. Found (percent): C, 56.14; H, 5.55; N, 3.34.

EXAMPLE 13

1,3-dimethyl-3-(3'-morpholinopropyl)-2,1-benzisothiazoline-2,2-dioxide hydrochloride A solution of the tosylate of Example 12 (4.1 g., 0.01 mole), as an oil, and 1.92 g. (0.022 mole) of morpholine in 50 ml. of dry toluene is refluxed for 20 hours, cooled, and poured into a mixture of benzene (40 ml.)-5% aqueous NaOH (40 ml.). The organic phase is washed several times with water, dried, and evaporated. The residual oil is treated with ethereal HCl to afford a light tan powder, which is recrystallized from ethanol-methanol - ether to give the 1,3 - dimethyl - 3 - (3' - morpholinopropyl) - 2,1 - benzisothiazoline - 2,2 - dioxide hydrochloride, M.P. 202–203°.

*Analysis.*—Calcd. for $C_{16}H_{25}ClN_2O_3S$ (percent): C, 53.24; H, 6.98; N, 7.76. Found (percent): C, 53.55; H, 7.08; N, 7.87.

EXAMPLE 14

1,3-dimethyl-3-(3'-N-methylpiperazinopropyl)-2,1-benzisothiazoline-2,2-dioxide dihydrochloride A solution of the tosylate of Example 12 (5.1 g., 0.0125 mole) and N-methylpiperazine (1.87 g., 0.019 mole) in 50 ml. of dry benzene is refluxed for 25 hours, cooled, washed with 5% NaOH and then water, dried ($Na_2SO_4$), and evaporated. The residual oil is dissolved in dry ether and treated with HCl gas. Recrystallization of the resulting solid from ethanol-ether affords 1,3-dimethyl - 3 - (3' - N - methylpiperazinopropyl) - 2,1-benzisothiazoline - 2,2 - dioxide dihydrochloride in the form of a white powder, M.P. 207–209°.

*Analysis.*—Calcd. for $C_{17}H_{29}Cl_2N_3O_2S$ (percent): C, 49.75; H, 7.13; N, 10.24. Found (percent): C. 49.51; H, 7.17; N, 10.18.

EXAMPLE 15

1,3-dimethyl-3-(3'-methylaminopropyl)-2,1-benzisothiazoline-2,2-dioxide hydrochloride A solution of the tosylate of Example 12 (8.5 g., 0.02 mole) in 200 ml. of benzene saturated with methylamine at 25° is heated in an autoclave at 100° for 24 hours. The cooled mixture is washed with saturated NaHCO₃ and saturated brine, dried ($Na_2SO_4$), and evaporated. The residual oil in dry ether is treated with HCl, and the precipitate recrystallized from ethanol-ether to give 1,3-dimethyl - 3 - (3' - methylaminopropyl) - 2,1 - benzisothiazoline - 2,2 - dioxide hydrochloride in the form of white granules, M.P. 164–166°.

*Analysis.*—Calcd. for $C_{13}H_{21}ClN_2O_2S$ (percent): C, 51.22; H, 6.94; N, 9.19. Found (percent): C, 51.23; H, 6.98; N, 9.06.

EXAMPLE 16

1,3-dimethyl-3-(3'-aminopropyl)-5-chloro-2,1-benzisothiazoline-2,2-dioxide hydrochloride A solution of 1,3-dimethyl-3-(2'-cyanoethyl)-5-chloro-2,1-benzisothiazoline (5.7 g., 0.02 mole) in 200 ml. of ammonia-saturated ethanol is treated with hydrogen at 25° and 1500 p.s.i. in the presence of freshly washed Raney nickel. The theoretical uptake is complete in approximately 2.5 hours. The catalyst is filtered and the filtrate evaporated to dryness. Elution of the residual oil from 200 g. of silica gel with chloroform-methanol (3:1) provides the amine as a colorless oil. Conversion of this material to a 1,3-dimethyl-3-(3'-aminopropyl)-5-chloro-2,1-benzisothiazoline-2,2-dioxide hydrochloride gives a white powder, M.P. 215–216°. Recrystallization from methanol-ether did not alter the melting point.

*Analysis.*—Calcd. for $C_{12}H_{17}ClN_2O_2S \cdot HCl$ (percent): C, 44.30; H, 5.58; N, 8.61. Found (percent): C, 44.09; H, 5.60; N, 8.75.

EXAMPLE 17

1,3-dimethyl-3-(3'-dimethylaminopropyl)-5-chloro-2,1-benzisothiazoline-2,2-dioxide hydrochloride A solution of the amine of Example 16 (3.6 g., 0.012 mole), 90% aqueous formic acid (2.5 g.), and 6 g. of aqueous formaldehyde is heated on a steam bath overnight. The crude product is isolated as described in Example 5 and is treated with dry HCl to give, after recrystallization from ethanol-ether, 1,3-dimethyl-3-(3'-dimethylaminopropyl) - 5-chloro-2,1-benzisothiazoline-2,2-dioxide hydrochloride in the form of a white powder, M.P. 127–130°.

*Analysis.*—Calcd. for $C_{14}H_{22}Cl_2N_2O_2S$ (percent): C, 47.59; H, 6.27; N, 7.93. Found (percent): C, 47.38; H, 6.19; N, 7.78.

We claim:

1. A compound selected from compounds of the formula

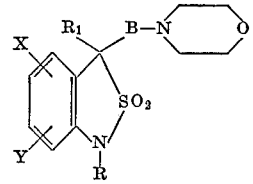

in which X and Y are hydrogen, alkyl of 1 to 4 carbon atoms, nitro, alkoxy of 1 to 3 carbon atoms, halogen or $CF_3$; R is alkyl of 1 to 4 carbons; $R_1$ is hydrogen or alkyl of 1 to 4 carbons; and B is an alkylene of 1 to 6 carbon atoms, and pharmaceutically acceptable salts thereof.

2. A compound of claim 1 in which X and Y are hydrogen, R and $R_1$ are methyl and B is propylene.

No references cited.

ALEX MAZEL, Primary Examiner

J. TOVAR, Assistant Examiner

U.S. Cl. X.R.

260—268 BC, 288 R, 293.4 E, 301; 424—248